June 26, 1928. 1,674,914
E. E. MURRAY
ELECTROMAGNETIC VALVE
Filed Dec. 13, 1924
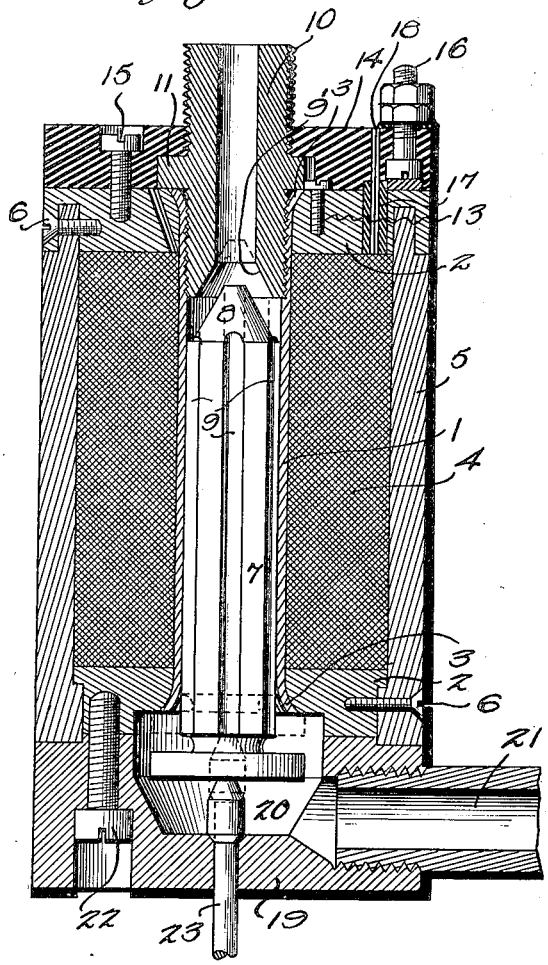
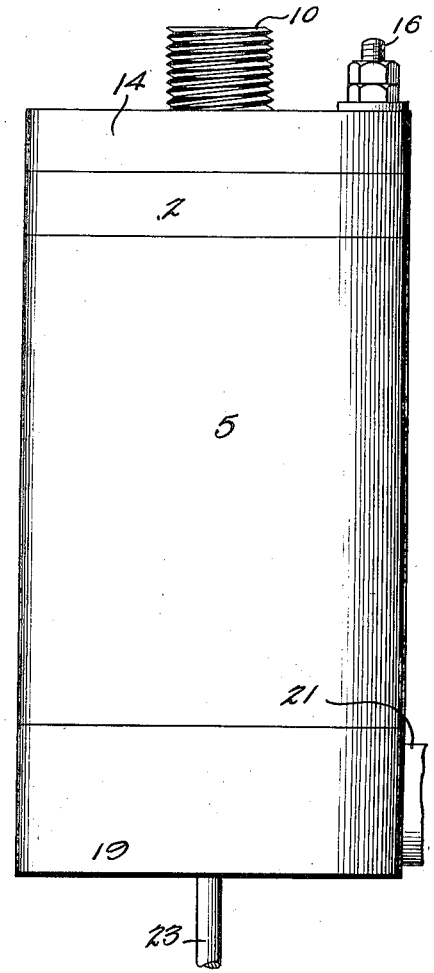
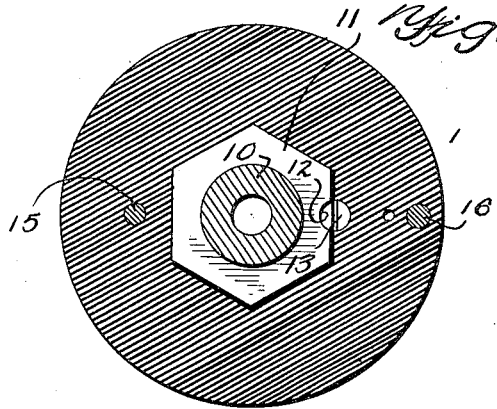
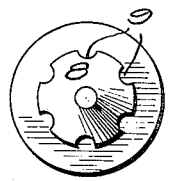
Inventor
EARLE E. MURRAY
By
Attorney Patented June 26, 1928.

1,674,914

UNITED STATES PATENT OFFICE.

EARLE E. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

ELECTROMAGNETIC VALVE.

Application filed December 13, 1924. Serial No. 755,761.

This invention relates to electro-magnetic valves, and more particularly to a valve in which the movable part or valve stem forms a part of, or is carried by, the movable part of an electro-magnet.

An object of the invention is the provision of a magnetic valve for use in various systems wherein the flow of air or other fluid is controlled electrically.

A further object of the invention is the provision of a valve of this character of rugged construction, which is simple and in which the number of parts is reduced to a minimum.

In carrying the invention into effect, I preferably employ a magnet of the solenoid type in which the field of the magnet forms a valve seat and in which the armature, core or plunger carries a valve member adapted to engage the seat.

In the accompanying drawings, I have shown one embodiment of the invention. In this showing:

Figure 1 is a central vertical sectional view,

Figure 2 is a front elevation,

Figure 3 is a horizontal sectional view on line 3—3 of Figure 1, and,

Figure 4 is an end elevation of the combined magnet, core and valve.

Referring to the drawings, the preferred form of the device consists of an electromagnet of the solenoid type, having a spool 1 formed of brass, which spool is provided with suitable heads 2, preferably formed of steel. As shown, the ends of the spool are flared, as at 3, to retain the heads in proper position. The magnet is provided with the usual windings 4 and may also be provided with a shell 5, which serves to combine the two heads of the spool together and permits of high pressure being admitted to the core. The shell further serves magnetically to complete the flux path and also acts as a cover for the winding to prevent water or moisture from getting into the coil. As shown, the shell may be secured to the heads by means of suitable fastening elements 6.

The magnet is provided with a core 7 arranged within the spool in the usual manner and this core is provided with a cone shaped, reduced upper end 8, forming a valve. Between the cone and the bottom of the core, the core or stem is provided with a plurality of passages 9 (see Figure 4). The valve 8 is adapted to coact with a valve seat 9' formed on the lower end of an externally threaded member 10. As shown, the upper end of the spool is internally threaded and is adapted to be engaged by the external threads of the valve member. Intermediate its ends, the valve member is provided with a hexagon 11 (see Figure 3) for the reception of a wrench or other suitable tool to permit assembly of the valve. At one side, the hexagonal portion 11 of the valve member is provided with a groove 12 adapted to receive a portion of a set screw 13 which is received in the head 2 (see Figure 1) and prevents the valve member from turning when in position.

A block 14 of fibre or other insulating material is arranged above the upper head and is secured thereto by suitable fastening elements 15. This member is adapted to receive binding posts 16. A bushing 17 of insulating material extends through the upper head and is adapted to receive a lead wire 18 extending from the coil to the binding post.

A base 19 is arranged beneath the lower head and is provided with a chamber 20 surrounding the bottom of the plunger. As shown, the base is threaded for the reception of an outlet pipe 21. The base fits on the lower head on a ground joint to prevent leakage and is secured thereto by suitable fastening elements 22. A manually operated plunger 23 extends through the base and is adapted to contact with the core 7 outwardly, as indicated in dotted lines.

In operation, the valve is normally in the full line position shown in Figure 1 of the drawings and is open. The magnet being in a deenergized condition, air or other fluid passes through the bore of the member 10, then through the passages 9 in the core to the chamber 20, and thence to the discharge pipe 21. When the magnet is energized, the core is raised to the dotted line position shown in Figure 1, causing the valve member 8 on the upper end of the core to engage the valve seat 9. This stops the flow of fluid.

The plunger 23 permits manual operation of the valve when desired, and further permits the valve to be closed at intervals for testing purposes.

In the drawings, I have shown a magnet in which one side is grounded and a single binding post provided. It will be apparent that a magnet having two or more terminals may be employed if desired, without departing from the invention.

By means of the construction disclosed, a combined valve and magnet is provided in which the valve is operated by the energizing of the magnet.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

In an electro-magnetic valve, a spool, a coil arranged on said spool, the upper end of said spool being threaded, a member detachably arranged in the threaded end of said spool and having a valve seat formed on its inner end, means for securing said member in position to prevent movement thereof, a core arranged in said spool, a valve formed on the upper end of said core and adapted to engage said valve seat when the magnet is energized, a base connected to the bottom of said spool and provided with a chamber communicating with the interior of said spool, and a plunger projecting from said base to permit manual operation of said valve.

In testimony whereof, I affix my signature.

EARLE E. MURRAY.